324-77. SR 6-12-73 XR 3,738,731

United States Patent [19]

Chandra et al.

[11] 3,738,731

[45] June 12, 1973

[54] VARYING AREA OPTICAL PROCESSING FOURIER ANALYZER

[75] Inventors: Subhash Chandra, Pennsburg; Raymond H. Lambert, Eaglesville, both of Pa.

[73] Assignee: General Electric Company, New York, N.Y.

[22] Filed: Aug. 25, 1971

[21] Appl. No.: 174,783

[52] U.S. Cl. ........ 350/162 SF, 235/181, 324/77 K, 340/173 LM, 346/17, 346/109

[51] Int. Cl. ........................ G11b 7/00, G06k 11/00

[58] Field of Search .................... 346/109, 108, 17; 324/77 K, 77 B, 77 D; 235/181; 340/173 LM; 350/162 SF, 162 R; 179/100.31, 100.3

[56] References Cited

UNITED STATES PATENTS 2,468,142 4/1949 Ulmer ....................... 179/100.31 X 3,427,104 2/1969 Blikken et al. ............. 350/162 R X 3,486,016 12/1969 Faiss ............................ 324/77 K X 3,612,658 10/1971 Slaymaker ..................... 350/162 SF

*Primary Examiner*—Joseph W. Hartary

*Attorney*—Allen E. Amgott, William G. Becker and Henry W. Kaufmann

[57] ABSTRACT

Signal to be analyzed for frequency content is recorded as variable-width track on film. This image is transformed by conventional coherent optics, and real frequency components appear along the real axis, extraneous components caused by variable-width record being off this axis and so readily excluded from consideration.

1 Claim, 3 Drawing Figures

PATENTED JUN 1 2 1973

3,738,731

VARYING AREA OPTICAL PROCESSING FOURIER ANALYZER

BACKGROUND OF THE INVENTION

1. Field of the Invention

This invention pertains to use of coherent optics to determine sinusoidal components of a varying signal.

2. Description of the Prior Art

A. Vander Lugt, IEEE Transactions on Information Theory, Vol. 10, 1964, pages 139 through 145, describes techniques for using photographic records of signals, concerning which he observes at page 141: "The coherent system operates on the specular amplitude transmission of the film." J. E. Rhodes, Jr., American Journal of Physics, Vol. 21, 1963, pages 337 through 343, observes in the same general connection, at page 341, after describing the analysis of sound recorded as a variable density (or transmission) on film, "A cylindrical lens will smear out a variable area sound-on-film record to a reasonable replica of variable density sound-on-film. Hence, the analysis is possible, but requires more than just a lens."

SUMMARY OF THE INVENTION

We have found that a variable-width record on film of a signal may be processed through conventional coherent optics to produce a Fourier transform of the signal. While there are various extraneous components off the axis which parallels the axis of travel of the film, the signals appearing on that axis are the frequency components of the signal just as they would be obtained from a variable-density record. The prior art practice of variable density recording requires very careful control of processing in order to preserve linearity of the signal record; obviously, any deviations from linearity would introduce harmonics not actually present in the signal. The binary nature of variable-area recording permits the use of extremely rapidly processable film, so that the entire process from recording to completed analysis may be completed in 2 seconds, which is very nearly real time for most purposes.

In our preferred embodiment we have used an oscillating mirror which scans a triangular mask across a slit. This general scheme is old in the motion picture art, e.g., in U.S. Pat. No. 1,997,976 to A.C. G. Petersen, issued Apr. 16, 1935. However, we employ a triangular mask rather than a triangular aperture as Petersen does, because we employ a thermally developing film which produces a negative record, so that the part of the film blocked off from light in recording remains transparent upon development. Film exposed to the signal to by analyzed by passing the recording slit is passed over a heated drum to develop it, and then through a gate which is illuminated by collimated coherent light from a laser, and which is in the front focal plane of a converging transform lens. By well known optical transform principles, a real image Fourier transform of the variable area signal is produced at the back focal plane of the transform lens. The variable area signal is not a varying transmission record of the amplitude of the original time-varying signal; it is a constant-transmission record of varying width. Consequently the two-dimensional Fourier transform of the variable area signal is not the transform of the original time-varying signal; but the optical signals, or light spots, which appear in the back focal plane along the one-dimensional axis parallel to the direction of motion of the film are representations of the frequency spectrum of the original one-dimensional time-varying signal. Thus, by masking off the other light spots off the axis of motion, one obtains the frequency spectrum of the signal portion which is in the gate. As the spectrum of the signal in the gate changes, the light spots will change accordingly. The uses of the frequency spectrum are too numerous to mention; according to the intended purpose, the spectrum may be photographed (e.g., by film moving transversely to the frequency axis) or observed by light-sensitive devices ranging from photocells aimed at particular frequency points on the axis to iconoscopes. Or, if the appearance of a particular frequency or frequencies is of interest, simple visual observation may suffice.

DESCRIPTION OF THE PREFERRED EMBODIMENT

Figure 1:
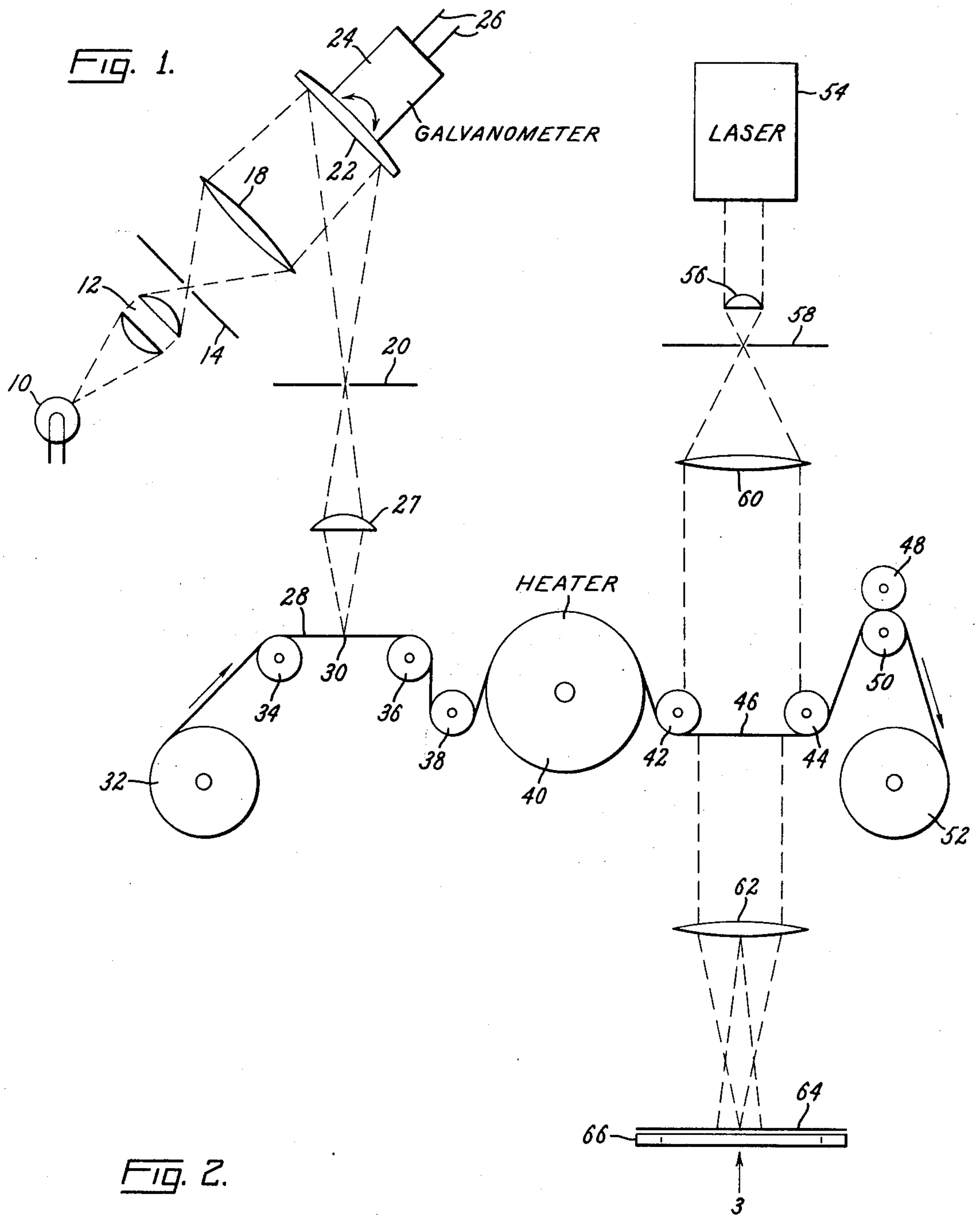
FIG. 1 represents an embodiment of our invention.
Figure 2:
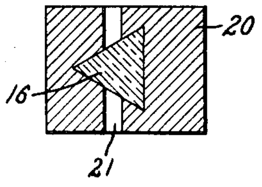
FIG. 2 represents a detail of the mask employed in recording.

An incandescent tungsten light source 10 in FIG. 1 radiates light to a condensing lens 12 which focusses it to the aperture of a mask 14, which is delineated in more detail in FIG. 2. The central aperture of mask 14 has an opaque triangular portion 16. Lens 18 focusses the image of triangular opacity 16 upon a mask 20 with stationary slit 21, via reflection from movable mirror 22. Mirror 22 is part of a high-speed transducer 24, represented generically by a rectangle. Transducer 24 is of the general nature of an oscilloscope galvanometer, having the linearity and damping requisite to permit it to follow accurately the signal to be analyzed, which is represented as fed to transducer 24 via leads 26. Stationary slit 21 is narrower than the image of triangular opacity 16 which is focussed overlappingly upon it, as represented by FIG. 2. As mirror 22 rotates responsively to the amplitude of the incoming signal, the image of 16 moves transversely to slit 21, and the lighted area not blocked by it from slit 21 will vary accordingly. The image of slit 21 is focussed by lens 27 upon film 28 at write gate 30, causing illumination to fall in two bands upon film 28, with a central dark part caused by the image of triangular opacity 16. When the film 28 is developed, this exposure causes the appearance of a central transparent band of width varying with the amplitude of the incoming signal, and dark edge bands. Film 28 as actually employed was a heat-developable film commercially available as Computer Film Type 781 of the Three M Company. The use of such a film has obvious convenience in not requiring wet chemical processing; but fast chemical development of more conventional photographic films is also old in the art, and conventional films could be employed with the usual assemblage of developing, washing, and fixing tanks, there being no problems of controlling gamma or other parameters in view of the nature of the recording process.

Film 28 is stored upon a storage drum 32, from which it passes over idlers 34 and 36 which stretch it across gate 30, and passes then over idler 38 and around drum heater 40, where it is developed by heat in the particular instance. It then passes over idlers 42 and 44, which extend it across processing gate 46, and then is drawn between drive rolls 48 and 50 (which are driven by any convenient means not shown as being obvious) and then is taken up on drum 52.

A collimated coherent source comprising a laser 54, condensing lens 56, pinhole aperture 58, and collimating lens 60 is arranged to direct its beam normal to processing gate 46 and thus normal to film 28. Processing gate 46 is in the front focal plane of transform lens 62, and Fourier plane 64 is at the back focal plane of transform lens 62.

However, while these locations are necessary if a true Fourier transform including both amplitude and phase information is to be obtained, if only amplitude information is required (producing what may be called the amplitude components of a Fourier transform), they are not essential. In this latter alternative case, the coherent light from laser 54 need not be collimated by condensing lens 56, but may be diverging or converging. Processing gate 46 need not be at any specific distance from transform lens 62, but need only be located so that only coherent light which has passed through film 28 will fall upon transform lens 62. But the amplitude Fourier plane, as we may call the plane where the light spots will appear, must be located at such a distance behind transform lens 62 that the coherent light, in the absence of film 28, would be focused there in an image plane which is not necessarily the focal plane. Since in our invention we make use only of amplitude information, this alternative mode of operation is quite as satisfactory for our purposes as the more elegant and conventional first arrangement.

The relation of frequency to displacement in the Fourier plane 64 is dependent upon the film speed. A signal of angular frequency W radians per second recorded upon film moving S meters per second will be recorded as W/S radians per meter. If the focal length of transform lens 62 is f meters, and the wavelength of light from laser 54 is L meters, the displacement D of the corresponding line in the Fourier plane 64 from the central axis of lens 62 will be $$D \times (L\,f/2\ \text{pi}) \times W/S \text{ meters.}$$

Since $W$ radians per second is 2 pi $F$ where $F$ is the corresponding frequency in hertz, this may be simplified to $$D = LfF/S$$

with no dimension added, since any units of length, provided they are all the same, will function correctly, making $D$ linearly proportional to $F$, ceteris paribus.

Figure 3:
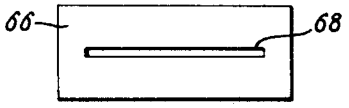
FIG. 3 represents a view of the manner of masking the output of the Fourier transform produced by the embodiment of FIG. 1.

FIG. 3 represents opaque mask 66 with a slit 68 which is aligned with the time axis of the record on film 28 so that it permits the viewing only of the light spots or signals in the image plane which represent frequency components of the original signal. Since these are real images, representing actual light flux at the plane, they may be viewed directly, or a diffusing screen may be introduced to permit their being viewed over a wider angle of observation.

To generalize the description of our preferred embodiment, we have provided means for making a variable-width record of the signal in which one axis is the axis of time, and the orthogonal axis is the amplitude axis of the signal, the signal being recorded as a symmetrical band which is optically uniform between the boundaries of the band — that is, between its amplitude boundaries; and the band differs in optical properties from the optical properties of the medium outside the boundaries. A variable density record is, or course, not optically uniform. Also, while we have disclosed a transparent symmetrical band and an opaque medium outside the boundaries it would obviously be possible (and might for some special purpose be desirable) to employ a medium such that outside the boundaries of the record band it would not be opaque, but would simply be of such color as to filter out the laser light. So the generalized description is only as broad as the facts. The laser 54 is a source of coherent light; and it is directed axially through the lens 62. The gate 46 is a means for supporting the record in the front of lens 62. Mask 66 at plane 64, with its slit parallel to and in line with the time axis of the record, serves to mask out light images lying off the axis. The signal recording means in our particular embodiment comprises means for projecting on the moving film 28 a lighted image of a slit 20 whose width (as a result of the motion of the image of wedge 16) is proportional to the amplitude of the signs. Because we employ a direct negative as the record, the image of the slit 20 that we project is a dark image; for a direct positive film we should project (by having wedge 16 a transparency on a dark background) a light image of the slit.

What is claimed and desired to be secured by Letters Patent of the United States is:

1. Means for indicating the frequency spectrum of a time-varying signal comprising:

a. a variable-width record of the signal in which one axis is the axis of time and the other axis is the axis of amplitude of the signal and the signal is recorded as a symmetrical band transparent and optically uniform between its amplitude boundaries and the record medium is opaque outside the boundaries;

b. a source of coherent light directed axially through a convergent spherical lens;

c. means for supporting the record between the lens and the source of coherent light so that the coherent light beam traverses the transparent parts of the record medium and the lens;

d. mask means at the image plane of the lens comprising a sheet opaque to the said coherent light having a single slit transparent thereto parallel to and in line with the image of the time axis of the said record whereby light spots appearing in said slit represent the frequency spectrum of said time-varying signal.

* * * * *